(12) United States Patent
Choi

(10) Patent No.: US 10,613,871 B2
(45) Date of Patent: Apr. 7, 2020

(54) COMPUTING SYSTEM AND METHOD EMPLOYING PROCESSING OF OPERATION CORRESPONDING TO OFFLOADING INSTRUCTIONS FROM HOST PROCESSOR BY MEMORY'S INTERNAL PROCESSOR

(71) Applicant: SAMSUNG ELECTRONICS CO., LTD., Suwon-si (KR)

(72) Inventor: Yoonseo Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 439 days.

(21) Appl. No.: 15/067,494

(22) Filed: Mar. 11, 2016

(65) Prior Publication Data

US 2017/0060588 A1 Mar. 2, 2017

(30) Foreign Application Priority Data

Sep. 1, 2015 (KR) ........................ 10-2015-0123656

(51) Int. Cl.
  *G06F 9/38* (2018.01)
  *G06F 15/80* (2006.01)
  *G06F 15/78* (2006.01)

(52) U.S. Cl.
  CPC ........ *G06F 9/3881* (2013.01); *G06F 15/7821* (2013.01); *G06F 15/80* (2013.01); *Y02D 10/12* (2018.01); *Y02D 10/13* (2018.01)

(58) Field of Classification Search
  CPC .... G06F 15/7821; G06F 9/3881; G06F 15/80; Y02D 10/13; Y02D 10/12

USPC ........................................................... 712/34
See application file for complete search history.

(56) References Cited

U.S. PATENT DOCUMENTS

| | | | |
|---|---|---|---|
| 2009/0164789 A1* | 6/2009 | Carvounas | G06F 21/445 713/176 |
| 2010/0186018 A1* | 7/2010 | Bell, Jr. | G06F 9/4856 718/104 |
| 2011/0157197 A1 | 6/2011 | Clemie et al. | |
| 2013/0061033 A1* | 3/2013 | Kim | G06F 15/7842 713/100 |
| 2014/0019690 A1* | 1/2014 | Hikichi | G06F 12/0862 711/137 |
| 2014/0022268 A1 | 1/2014 | Lee et al. | |
| 2014/0028689 A1 | 1/2014 | Teng | |
| 2015/0199150 A1* | 7/2015 | Jeon | G11C 7/1078 711/114 |
| 2016/0092237 A1* | 3/2016 | Veith | G06F 9/3873 712/22 |

(Continued)

FOREIGN PATENT DOCUMENTS

| | | |
|---|---|---|
| JP | 2009-207014 A | 9/2009 |
| KR | 10-2014-0011671 A | 1/2014 |

*Primary Examiner* — Aimee Li
*Assistant Examiner* — Shawn Doman
(74) *Attorney, Agent, or Firm* — F. Chau & Associates, LLC

(57) ABSTRACT

A computing system includes a host processor configured to process operations and a memory configured to include an internal processor and store host instructions to be processed by the host processor. The host processor offloads processing of a predetermined operation to the internal processor. The internal processor possibly provides specialized hardware designed to process the operation efficiently, improving the efficiency and performance of the computing system.

10 Claims, 10 Drawing Sheets

(56) References Cited

U.S. PATENT DOCUMENTS

| | | | |
|---|---|---|---|
| 2016/0098200 A1* | 4/2016 | Guz | G06F 11/30 |
| | | | 711/154 |
| 2016/0196142 A1* | 7/2016 | Wheeler | G06F 15/7821 |
| | | | 712/234 |
| 2017/0123987 A1* | 5/2017 | Cheng | G06F 15/7821 |

* cited by examiner

FIG. 4A

```
int i = get_local_id(0);
float f = sqrt(a[i]);
f = f + 3.0;
```
410

```
// R7 contains address of a[i]

LOAD R2 [R7]  // after Load, R2 will contatin the value of a[i]
```

CALL SOFTWARE LIBRARY OF SQRT OPERATION
```
// apply sqrt on R2
// codes for accurate SQRT
// could be hundreds of lines
// can include divergence in Control Flow
// ...
```

```
// R9 contains the value of sqrt(a[i])
FADD R9 R9 R6
```

FIG. 5

```
PIM_INTRINSIC (R7, OP_SQRT, R9, R10)   // R7 contains address to a[i]
                                        // R9 will contain sqrt result (LSU will keep this info.)
                                        // R10 will contain optional result, if any
                                        // Address in R7 and OP_SQRT will be delivered to PIM.
                                        // The result will be delivered back to host register R9 (and R10)
                                        // No big difference from LOAD in terms of interfaces
```

```
int i = get_local_id(0);
b[i] = sqrt(a[i]);
```
610

```
// R7 contains address of a[i]

LOAD R2 [R7]   // after Load, R2 will contatin the value of a[i]
```

CALL SOFTWARE LIBRARY OF SQRT OPERATION
```
// apply sqrt on R2
// codes for accurate SQRT
// could be hundreds of lines
// can include divergence in Control Flow
// ...
```

```
STORE R9 [R8]     // Store the sqrt result back;
                  // R8 contains the address to b[i]
```

FIG. 7

```
PIM_INTRINSIC (R7, R8, OP_SQRT_ST, R10)   // R7 contains address to a[i]
                                          // R8 contains address to b[i]
                                          // R10 will contain optional result, if any
                                          // Source and destination addresses in R7 and R8,
                                          // and command OP_SQRT will be delivered down to PIM
```

700

COMPUTING SYSTEM AND METHOD EMPLOYING PROCESSING OF OPERATION CORRESPONDING TO OFFLOADING INSTRUCTIONS FROM HOST PROCESSOR BY MEMORY'S INTERNAL PROCESSOR

CROSS-REFERENCE TO RELATED APPLICATION(S)

This application claims the benefit under 35 USC 119(a) of Korean Patent Application No. 10-2015-0123656 filed on Sep. 1, 2015 in the Korean Intellectual Property Office, the entire disclosure of which is incorporated herein by reference for all purposes.

BACKGROUND

1. Field

The following description relates to a computing system. The following description also relates to a method for processing operations for such a computing system.

2. Description of Related Art

Processors increasingly play important roles in computing environments. For example, processors are the main agents responsible for processing high-resolution images or videos and for implementing complex software algorithms. Thus, development of various processor architecture techniques such as, for example, a dual-core processor, a quad-core processor, and multi-threading is directly linked to development of relative technical fields. For example, these processor architecture techniques are useful for an image processing field and for a software engineering field. In computing environments, processors are driven using limited resources. For example, a communication bandwidth between a processor and a memory may be limited due to performance bottleneck. Also, energy consumption of a processor may be limited to be below a certain level. Accordingly, recently, much research has been conducted to increase processor performance using limited resources in a computing environment.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Examples related to a computing system and a method for processing operations for such a computing system. However, the examples are not limited to these examples, and other examples pertain to appropriate aspects of the following description.

Additional examples are set forth in part in the description which follows and, in part, are apparent from the description, or are learned by practice of the presented exemplary embodiments.

In one general aspect, a computing system includes a host processor configured to process operations, and a memory configured to comprise an internal processor and store host instructions to be processed by the host processor, wherein in response to an offloading instruction being included in the host instructions received from the memory to be processed, the host processor offloads processing of an operation corresponding to the offloading instruction to the internal processor.

The internal processor may be a dedicated processor configured to process the operation corresponding to the offloading instruction.

The operation corresponding to the offloading instruction may include at least one of a square root operation, a reciprocal operation, a log operation, an exponential operation, a power series operation, and a trigonometric operation, and the internal processor may include hardware logic including a special function unit (SFU) configured to process the operation corresponding to the offloading instruction.

The host processor may include a cache and a processing element (PE) configured to process the host instructions to generate a memory request, and the generated memory request may be a request of a unit of a cache line including at least one of a load request, a store request, and an offloading request corresponding to the offloading instruction.

The computing system may further include a memory controller, wherein in response to a cache miss occurring in the cache with respect to the load request or the store request, the load request or the store request is transferred to the memory controller, and the offloading request may bypass the cache and may be transferred to the memory controller.

The offloading request may be transferred to the memory controller regardless of the occurrence of a cache hit or the cache miss.

The internal processor may store a result of processing the operation corresponding to the offloading instruction in a buffer of the internal processor or a memory array implemented separately from the internal processor in the memory.

The host processor may be a central processing unit (CPU) or a graphics processing unit (GPU), and the internal processor may be a processor-in-memory (PIM).

The host processor may offload the processing of the operation corresponding to the offloading instruction to the internal processor based on a result of comparing a cost required when the operation corresponding to the offloading instruction is processed using a software library to a cost required when the operation corresponding to the offloading instruction is processed by the offloading to the internal processor.

In another general aspect, a method of processing an operation in a computing system includes loading host instructions to be processed by a host processor from a memory, determining whether an offloading instruction is included in the host instructions, and in response to the offloading instruction being included in the host instructions, offloading processing of an operation corresponding to the offloading instruction from the host processor to an internal processor included in the memory.

The internal processor may be implemented as a dedicated processor for processing the operation corresponding to the offloading instruction.

The operation corresponding to the offloading instruction may include at least one of a square root operation, a reciprocal operation, a log operation, an exponential operation, a power series operation, and a trigonometric operation, and the method may further include driving hardware logic of a special function unit (SFU) implemented in the internal processor in order to process the operation corresponding to the offloading instruction.

The method may further include generating a memory request based on the host instructions processed by a processing element (PE) included in the host processor, wherein the generated memory request is a request of a unit of a cache including at least one of a load request, a store request, and an offloading request corresponding to the offloading instruction.

When a cache miss occurs in the at least one cache with respect to the load request or the store request, the load request or the store request may be transferred to the memory controller, and the offloading request may bypasses the cache and be transferred to the memory controller.

The method may further include storing a result of processing the operation corresponding to the offloading instruction, which is performed by the internal processor, in a buffer of the internal processor or a memory array implemented separately from the internal processor in the memory.

The host processor may be a central processing unit (CPU) or graphics processing unit (GPU), and the internal processor may be a processor-in-memory (PIM).

The method may further include comparing a cost required when the operation corresponding to the offloading instruction is processed using a software library with a cost required when the operation corresponding to the offloading instruction is processed by the offloading of the internal processor, wherein the offloading includes offloading the processing of the operation corresponding to the offloading instruction based on a result of the comparison.

In another general aspect, a host processor includes a loader/storer configured to load host instructions stored in a memory, a determiner configured to determine whether an offloading instruction is included in the host instructions, and a controller configured to offload processing of an operation corresponding to the offloading instruction from the host processor to an internal processor included in the memory in response to an offloading instruction being included in the host instructions.

Other features and aspects will be apparent from the following detailed description, the drawings, and the claims.

BRIEF DESCRIPTION OF THE DRAWINGS

FIG. 4A is a view showing a portion of a source-level kernel code that is potentially executed by a host processor according to an example.

FIG. 4B is a view showing an assembly code that implements a square root (SQRT) operation according to an example.

FIG. 5 is a view showing an assembly code in an example in which there is an internal processor, that is, a processing-in-memory (PIM) processor, having a special function unit (SFU) of an SQRT operation in the computing system according to an example.

FIG. 6A is a view showing a portion of a source-level kernel code that is executed by a host processor according to another example.

FIG. 6B is a view showing an assembly code that implements an SQRT operation according to another example.

FIG. 7 is a view showing an assembly code in an example in which there is an internal processor, that is, a PIM processor, having an SFU of an SQRT operation in a computing system according to another example.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
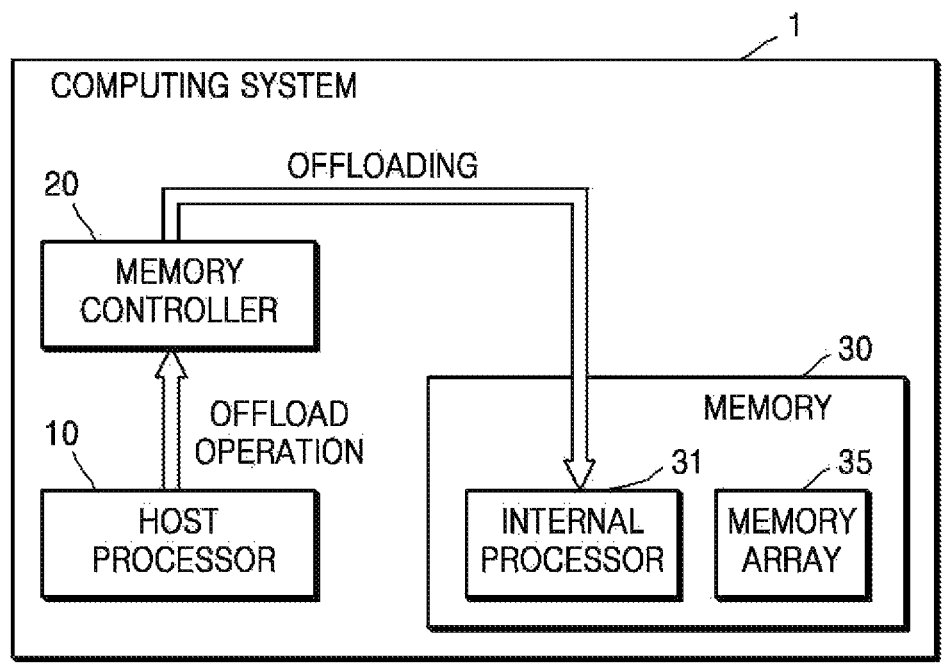
FIG. 1 is a block diagram of a computing system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now be made in further detail to examples, certain examples of which are illustrated in the accompanying drawings, wherein like reference numerals refer to like elements throughout. In this regard, the present examples potentially have different forms and are not to be construed as being limited to the descriptions set forth herein. Accordingly, the examples are merely described below, by referring to the figures, to explain the examples. As used herein, the term "and/or" includes any and all combinations of one or more of the associated listed items. Also, expressions such as "at least one of," when preceding a list of elements, modify the entire list of elements and are not intended to modify the individual elements of the list.

Terms used in the examples have been selected as general terms that are widely used at present, in consideration of the functions of the examples. However, the usage of the terms is possibly altered according to the intent of an operator skilled in the art, conventional practice, or introduction of new technology. Also, if there is a term that is arbitrarily selected for use in a specific case, in this case, a meaning of the term is to be described in further detail in a corresponding description portion of the examples. Therefore, the terms used herein are to be defined on the basis of the entire content of the examples instead of a simple name of each of the terms.

In the following description of examples, when one part, element, device, or the like is referred to as being "connected" to another part, element, device, or the like, it is to be understood that the former element is possibly "directly connected" to the latter, or "electrically connected" to the latter via an appropriate intervening part, element, device, or the like. Furthermore, when one part is referred to as "comprising," or "including" or "having" other elements, it is to be understood that the element potentially comprises or includes or has only those elements, or other elements as well as those elements if there is no specific limitation. Moreover, each of terms such as "unit" and "module" described in the examples refers to an element for performing at least one function or operation, and is possibly implemented in hardware.

The terms "comprising" and "including" used herein are not to be construed to necessarily include all of the elements or steps disclosed herein, and are possibly to be construed not to include some of the elements or steps thereof, or are possibly to be construed to further include additional elements or steps.

The following description of the examples is not to be construed to limit the scope of the examples. It is to be understood that apparent modifications and variations are to be construed as falling within the scope of the present examples. Examples are to be described in further detail below with reference to the accompanying drawings.

FIG. 1 is a block diagram of a computing system according to an example.

Referring to the example of FIG. 1, a computing system 1 includes a host processor 10, a memory controller 20, and a memory unit or memory 30. In this example, the memory 30 includes an internal processor 31 and a memory array 35. In the example of FIG. 1, only elements associated with examples are shown as being included in the computing system 1. Accordingly, it is to be understood that other general-purpose elements are optionally further included in computing system 1 in addition to the elements shown in the example of FIG. 1.

Examples of the computing system 1 include, but are not limited to, a desktop computer, a notebook computer, a smartphone, a personal digital assistant (PDA), a mobile media player, a video game console, a television set-top box, a tablet device, an e-book reader, a wearable device, etc. That is, various electronic devices are included as the computing system 1. However, these examples are only examples, and other devices are used in other examples as the computing system 1.

The host processor 10 corresponds to hardware that processes various operations.

For example, the host processor 10 corresponds to a central processing unit (CPU), a graphic processing unit (GPU), or an application processor (AP). Alternatively, the host processor 10 implemented using a combination of such processors. That is, the host processor 10 potentially corresponds to any device that is responsible for processing functions in the computing system 1.

When the host processor 10 corresponds to a CPU, the host processor 10 operates as hardware that controls overall functioning of the computing system 1 and controls other elements such as the memory controller 20 and the memory 30.

When the host processor 10 corresponds to a GPU, the host processor 10 operates as hardware that controls graphics processing functioning of the computing system 1. That is, the host processor 10 manages various types of graphics pipeline processing, such as OpenGL, DirectX, and so on.

In the example of FIG. 1, the memory controller 20 is hardware that accesses the memory 30 according to memory requests issued by the host processor 10 and performs control operations to load or store various kinds of data from or into the memory 30. Here, the data that is loaded from the memory 30 is possibly, for example, host instructions, source codes, and data associated with various types of operations.

As with the host processor 10, the internal processor included in the memory 30 is hardware having a processing function and a processor packaged with the memory array 35 in a chip of a memory package of the memory 30. Here, the term "internal" is used to denote the presence inside the memory 30. Accordingly, a processor that is "outside" the memory 30 refers to, for example, the host processor 10.

For example, the internal processor 31 corresponds to a processor-in-memory (PIM). In this example, the PIM is a device configured to process data of the memory array 35 without having latency by using dedicated pins to connect a processor implemented as hardware logic to the memory array 35. A PIM architecture enables low-latency fast memory access because a processor and a memory are implemented together on a chip. For example, the memory 30 having the internal processor 31 such as the PIM is also possibly referred to as an intelligent random access memory (RAM), computational RAM, or smart memory.

In this example, the memory array 35 included in the memory 30 corresponds to a RAM, such as a dynamic RAM (DRAM), a static RAM (SRAM), so on, or a device, such as a read-only memory (ROM), an electrically erasable programmable ROM (EEPROM), and so on. These types of memory differ in that while both store data, RAM is rewritable, but ROM is written to once and is not subsequently rewritable. That is, the memory array 35 corresponds to a device that stores data, such as source codes, instructions, and so on, that have been processed by the host processor 10 or the internal processor 31 and provides data, such as source codes, instructions, and so on, to be executed by the host processor 10 or the internal processor 31.

The host processor 10 receives source codes associated with any function to be processed from the memory 30 and executes the received source codes. In other words, the host processor 10 receives host instructions from the memory 30 and executes the received host instructions in order to process various operations such as, for example, an arithmetic operation, a shading operation, and so on.

When an offloading instruction is included in the host instructions, the host processor 10 offloads processing of an operation corresponding to the offloading instruction to the internal processor 31 of the memory 30. The term "offloading" as used herein denotes that the internal processor 31 performs processing of a certain operation instead of the host processor 10.

In general, a time taken for the host processor 10 to access and load data stored in the memory array 35 is possibly several hundreds of cycles, which causes high power consumption. Accordingly, when the internal processor 31 in the memory 30 instead performs a predetermined operation, and the host processor 10 receives only an operational result of the internal processor 31, it is more efficient in terms of the memory bandwidth or power consumption. That is, according to examples, the host processor 10 increases processing performance using the internal processor 31, for example, the PIM, under an instruction level or a software layer.

Figure 2:
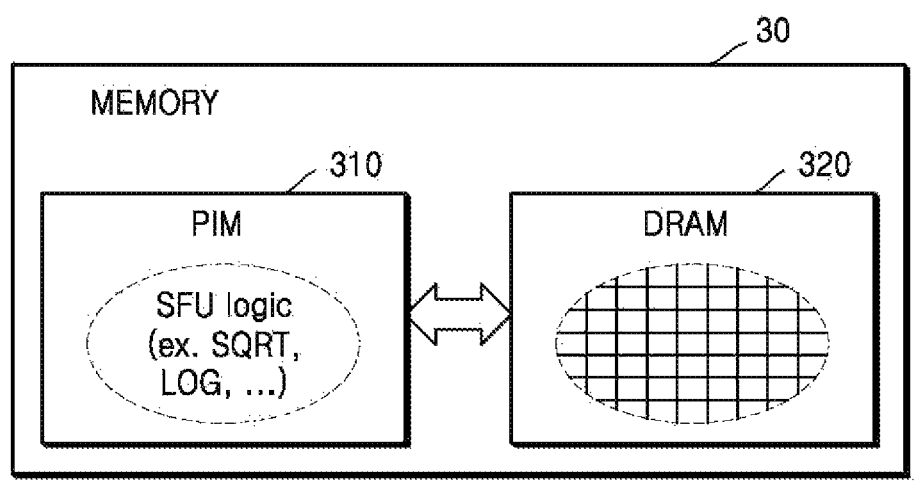
FIG. 2 is a block diagram showing a detailed hardware configuration of a memory unit according to an example.

FIG. 2 is a block diagram showing a detailed hardware configuration of a memory according to an example.

Referring to the example of FIG. 2, the memory 30 includes a PIM 310 and a DRAM 320. Here, in the example of FIG. 2, the PIM 310 corresponds to the internal processor 31 of FIG. 1, and the DRAM 320 corresponds to the memory array 35 of FIG. 1. Accordingly, in the examples to be described further below, the PIM 310 and the internal processor 31 are considered to be the same element. Also, the DRAM 320 is considered to be the same element as the memory array 35. In FIG. 2, for example, the memory array 35 is described as corresponding to the DRAM 320, but is not limited to being DRAM. In other examples, the memory array 35 corresponds to a different type of memory device, such as an SRAM, in addition to the DRAM 320. In the example of FIG. 2, only elements associated with examples are shown as being included in the memory 30. Accordingly, it is to be understood that other general-purpose elements are optionally further included in addition to the elements shown in FIG. 2.

According to an example, the PIM 310 corresponds to a processor having hardware logic configured to implement a special function unit (SFU) corresponding to a certain type of operation. Examples of the certain type of operation include, but are not limited to, a square root (SQRT) operation, a reciprocal operation, a log operation, an exponential operation, a power series operation, a trigonometric operation, and so on. In other words, the certain type of operation is referred to as a special operation. For example, the special operation is a mathematical operation for which specialized hardware is helpful in order to achieve the maximum efficiency and performance when executing that type of operation. That is, the hardware logic of the SFU implemented inside the PIM 310 may be driven in order to process the certain type of operation.

For example, the host processor 10 of FIG. 1 includes operation circuits, for example, hardware logic, that perform various types of operations that are implemented using many transistors. Depending on the example, the host processor 10 is not implemented using operation circuits, for example, hardware logic, for directly performing the above-described SQRT operation, reciprocal operation, log operation, exponential operation, power series operation, and trigonometric operation. Instead, the host processor 10 is implemented using operation circuits, for example, hardware logic, that approximate the above-described operations to a polynomial and then process the approximated operations. For example, the polynomial is an appropriate series that converges to provide the values associated with the operations. Such an approach is used because it is inefficient, in terms of performance, power, and area (PPA) considerations, that the operation circuits, for example, hardware logic, for directly performing the above-described types of operations and similar operations are implemented in the host processor 10 itself.

Accordingly, the PIM 310 is implemented as a dedicated processor for processing only the above-described types of operations. Alternatively put, the PIM 310 processes a computing function that is not implemented in the host processor 10 instead of the host processor 10. Accordingly, the computing function is implemented at an instruction level of the host processor 10. However, examples are not limited to this particular approach. In one example, the PIM 310 is implemented as a processor for processing general operations other than the above-described types of operations.

When offloading of the above-described types of operations is requested by the host processor 10, the PIM 310 communicates with the DRAM 320 in the memory 30 so as to process the above-described types of operations, thus assisting in reducing a memory access bandwidth of the host processor 10 and reducing power consumption of the host processor 10.

Thus, in this example, a result of the operations performed by the PIM 310 is stored in a buffer of the PIM 310 or the DRAM 320. Subsequently, the operation result that is stored in the buffer of the PIM 310 or the DRAM 320 is transferred to the host processor 10 using a similar way to the way in which a result of a general memory load operation is transferred.

Figure 3:
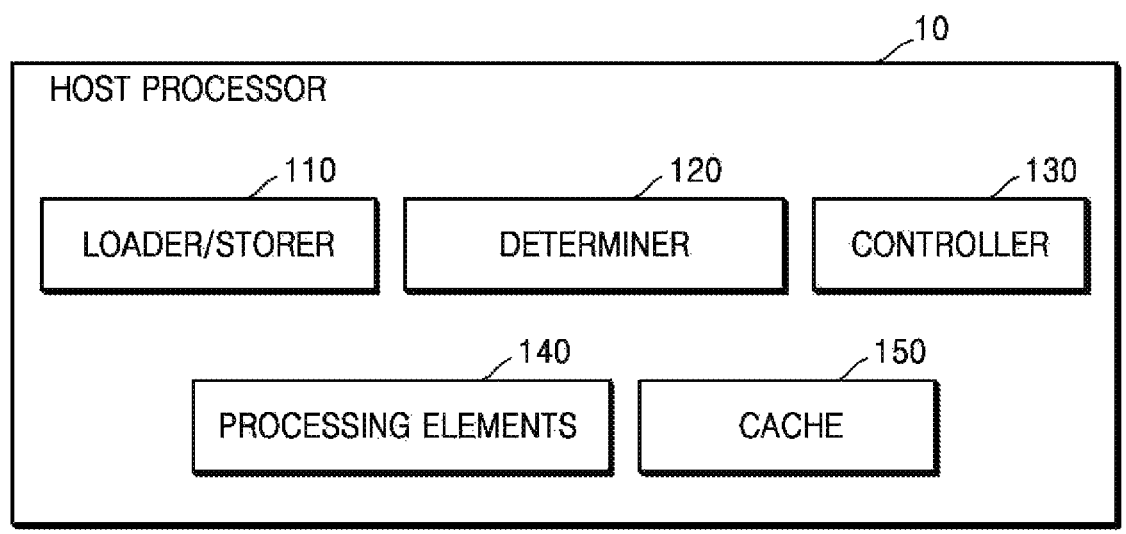
FIG. 3 is a block diagram showing a detailed hardware configuration of a host processor according to an example.

FIG. 3 is a block diagram showing a detailed hardware configuration of a host processor according to an example.

Referring to the example of FIG. 3, the host processor 10 includes a load/store unit (LSU) or loader/storer 110, a determination unit or determiner 120, a control unit or controller 130, processing elements (PEs) 140, and a cache 150. Unlike in the example of FIG. 3, in another example, the loader/storer 110, the determiner 120, the controller 130, and the PEs 140 are implemented as a portion of an integrated whole. However, in FIG. 3, only elements associated with examples are shown as being included in the host processor 10. Accordingly, it is to be understood by those skilled in the art that other general-purpose elements are optionally further included in addition to or instead of the elements shown in the example of FIG. 3.

For example, the loader/storer 110 loads a variety of data associated with an operation from the memory 30, that is, the memory array 35, in addition to host instructions. Also in this example, the loader/storer 110 performs control operations to store data processed by the host processor 10 in the memory 30, that is, the memory array 35.

The determiner 120 determines whether an offloading instruction is included in the host instructions. For example, the offloading instruction refers to an instruction for performing a certain type of operation, and examples of the certain type of operation include an SQRT operation, a reciprocal operation, a log operation, an exponential operation, a power series operation, and a trigonometric operation as discussed further, above. For example, the PIM 310 of FIG. 2 is implemented as a dedicated processor for processing the certain type of operation corresponding to the offloading instruction. Hence, the PIM 310 has hardware logic that implements the SFU for processing the certain type of operation corresponding to the offloading instruction.

When the offloading instruction is included in the host instructions, the controller 130 offloads processing of an operation corresponding to the offloading instruction from the host processor 10 to the internal processor 31, that is, the PIM 310 of FIG. 2, included in the memory 30.

The PEs 140 performs operations by executing the host instructions. For example, the PEs 140 generates memory requests such as a load request for loading data from the memory 30, for example, the memory array 35, and a store request for storing data in the memory 30, for example, the memory array 35, by executing the host instructions. When the offloading instruction is included in the host instructions, the PEs 140 also potentially generates an offloading request.

The cache 150, which is possibly a cache memory, is a memory device for the PEs 140 to aid in performing fast access according to the generated memory requests, for example, the load request or store request. An example in which there is the data according to the load request or store request in the cache 150 is called a cache hit, or a cache memory hit. Also, the PEs 140 access needed data in the cache 150 at a high speed. However, an example in which there is not the data according to the load request or store request in the cache 150 is called a cache miss or a cache memory miss. Also, the load request or store request of the PEs 140 is possibly transferred to the memory controller 20 of FIG. 1. As a result, the PEs 140 acquires needed data through accessing of the memory 30, for example, the memory array 35.

In examples, the memory request includes all or some of the load request, the store request, and the offloading request. For example, the memory request is generated as a request of a unit of a cache line in order to perform loading/storage in units of one line of the cache 150. However, when the offloading request is included in the memory request, the offloading request bypasses the cache 150 and is transferred to the memory controller 20. Here, the cache bypass is applied when the offloading request is transferred from the host processor 10 side to the memory controller 20 side in a single direction. However, examples are not limited to this approach. Although not described in detail in the examples, the cache bypass is applied even when the offloading request is transferred in an opposite direction. That is, the offloading request bypasses the cache 150 and is transferred to the memory controller 20, regardless of whether a state of the cache 150 is a cache hit or cache miss. As in a response to a general memory request, for example, a load request or store request, a response of the offloading request is accessed by the host processor 10 via the memory 30, the memory controller 20, and the cache 150 for information storage and transfer.

FIG. 4A is a view showing a portion of a source-level kernel code that is possibly executed by a host processor according to an example.

Referring to the example FIG. 4A, code that calls a mathematic function of an SQRT is partially included in the kernel code 410. When the SQRT operation is translated to a host instruction by a compiler, the SQRT operation is converted into a large number of instructions for approximating the SQRT operation. When the SQRT operation is converted into the large number of instructions, a code for a one-time SQRT operation is possibly difficult to include in one code trace and thus is possibly divided into several code traces. Accordingly, because of the one-time SQRT operation, an overall kernel code 410 is performed very slowly, and also power consumption increases in proportion to the number of instructions.

FIG. 4B is a view showing an assembly code that implements an SQRT operation according to an example.

Referring to the example of FIG. 4B, an assembly code 420 that implements the SQRT operation calls a software library for the SQRT operation. As described above, comparatively accurate calculation is performed on the SQRT operation using the software library. However, many instructions are executed to make the calculation, thus requiring a long operation processing time and consuming much power. Since the software library for the SQRT operation is an alternative approach to examples, its detailed description is omitted for brevity.

FIG. 5 is a view showing an assembly code in a case where there is an internal processor, that is, a PIM, having an SFU of an SQRT operation in a computing system according to an example.

Referring to the example FIG. 5, assembly code 500 in a case where there is an internal processor 31 includes host instructions for performing the same SQRT operation as the codes 410 and 420 described in the example of FIGS. 4A and 4B.

In the example of FIG. 5, the instruction "PIM_INTRINSIC" is an offloading instruction, which is an instruction for offloading the SQRT operation to the internal processor 31 that is, the PIM 310, and processing the SQRT operation in the internal processor 31, that is, the PIM 310.

In the assembly code 500, R7 indicates a memory address of a[i] in the memory array 35, R9 is a register in which a result obtained by performing the SQRT operation is to be stored in a[i], and R10 indicates a register that optionally stores an incidental value generated while the SQRT operation is performed, if relevant.

Information to be transferred to the memory 30 according to a PIM_INTRINSIC instruction for an OP_SQRT command is the OP_SQRT command and a memory address stored in the R7. Compared to the load instruction, in which a load command and information of a memory address to be loaded are transferred to the memory 30, the offloading instruction (PIM_INTRINSIC) has a slightly different command structure so as to be understood by the loader/storer 110 or the memory controller 20. However, the offloading instruction (PIM_INTRINSIC) possibly similarly performs a coalescing process or a process of recoding registers in which a result is to be stored. For example, the above-described offloading instruction (PIM_INTRINSIC) loads data for one memory address. Thus, the loader/storer 110 is sequentially included in a queue, as with another general load or store request. However, unlike the above-described process, there is an example in which the offloading instruction requests data of two or more memory addresses to be loaded. Thus, the loader/storer 110, the memory controller 20, and so on are possibly expanded to process the information for this example.

Unlike instructions associated with a general operation such as a load instruction or a store instruction, the offloading instruction (PIM_INTRINSIC) is processed by using the internal processor 31 included in the memory 30 and bypasses the cache 150 when loading data stored in a memory that is an operand of the operation. In order to bypass the cache 150, a function of loading data to or storing data in the cache 150 is deactivated for the offloading instruction (PIM_INTRINSIC).

In the assembly code 500, "PIM_INTRINSIC (R7, OP_SQRT, R9, R10)" is considered a form of instruction in which instructions of "Load R2 [R7]" and "R9=SQRT(R2)" are combined together into a single instruction. Here, although effective data is stored in the cache 150, the instruction of "Load R2 [R7]" does not access the cache 150 when the instruction of "Load R2 [R7]" is transferred from the loader/storer 110 to the memory controller 20. That is, the cache 150 is bypassed for such an instruction. Both of the SQRT instruction and the load instruction are delivered to the memory 30 through the memory controller 20. In the memory 30, data is loaded from an area of the memory array 35 or the DRAM 320 corresponding to a given memory address. The internal processor 31, for example, the PIM 310 executes the SQRT instruction using the loaded data. An SQRT result processed by the internal processor 31, for example, the PIM 310, is stored in a buffer of the internal processor 31, for example, the PIM 310, or the memory array 35 or the DRAM 320. Finally, the SQRT result stored in the buffer of the internal processor 31, for example, the PIM 310, or the memory array 35 or the DRAM 320 is transferred to the host processor 10. Also, while the SQRT result is delivered to the host processor 10, data corresponding to a memory address, which has been stored in R7 of the memory 30, is written to the cache 150 appropriately.

As a result, this may be considered as piggybacking the SQRT operation to the load instruction. Accordingly, an example in which the SQRT operation is processed in the internal processor 31, for example, the PIM 310, by the offloading instruction (PIM_INTRINSIC) is more efficient than an example in which the SQRT operation is converted into a large number of instructions through a software library, in terms of factors such as memory bandwidth and/or power consumption.

In examples, a process in which the offloading instruction (PIM_INTRINSIC) is performed possibly affects or is affected by a cache allocation policy and a cache writing policy. For example, according to a write-back policy, it is possible that there is not the most recent data in the memory array 35 or the DRAM 320 of the memory 30. Accordingly, before the offloading instruction (PIM_INTRINSIC) is performed, the host processor 10 possibly performs a control operation such that data of the memory address to be requested by the offloading instruction (PIM_INTRINSIC) is prewritten from the cache 150 to the memory, or alternatively employs a pre-write-through policy.

FIG. 6A is a view showing a portion of a source-level kernel code that may be executed by a host processor according to another example. FIG. 6B is a view showing an assembly code that implements an SQRT operation according to another example.

Referring to the examples of FIGS. 6A and 6B, unlike the examples of FIGS. 4A and 4B, the codes 610 and 620 include a code for storing a result of processing the SQRT operation to a memory address represented as b[i]. Hence, when the SQRT operation is performed by the codes 610 and 620 shown in the examples of FIGS. 6A and 6B, as described above, the SQRT operation is processed using a software library including a large number of instructions.

FIG. 7 is a view showing an assembly code in an example in which there is an internal processor, that is, a PIM, having an SFU of an SQRT operation in a computing system according to another example.

Referring to the example of FIG. 7, unlike the OP_SQRT command of FIG. 5, an OP_SQRT_ST command is defined in the offloading instruction (PIM_INTRINSIC) of the assembly code 700. As described above in the codes 610 and 620 of FIGS. 6A and 6B, the OP_SQRT_ST command is a command that includes storing a result of processing the SQRT operation. That is, R8 having an address of b[i] corresponding to a storage destination is transferred in addition to R7 having a memory address of a[i].

In this example, the offloading instruction (PIM_INTRINSIC) of the example of FIG. 7 processes two memory addresses. Accordingly, the loader/storer 110, the memory controller 20, and so on possibly are to be expanded to increase content to be processed per command. Likewise, coalescing logic possibly is to be expanded to consider two addresses at once.

According to the offloading instruction (PIM_INTRINSIC) of the example of FIG. 7, loading from a[i] and also storing in b[i] is possibly piggy-backed to the SQRT operation, thus efficiently using memory bandwidth in comparison with an example in which the load instruction, the SQRT operation using the software library, and the store instruction are processed separately from one another.

In FIGS. 4A to 7, the SQRT operation has been described as an example operation whose execution is accelerated and facilitated. However, examples are not limited to this particular operation and are applicable to different types of operations. In addition, the codes described in FIGS. 4A to 7 are merely illustrative examples, but the examples are not limited to these examples and other examples are optionally used appropriately.

Figure 8:
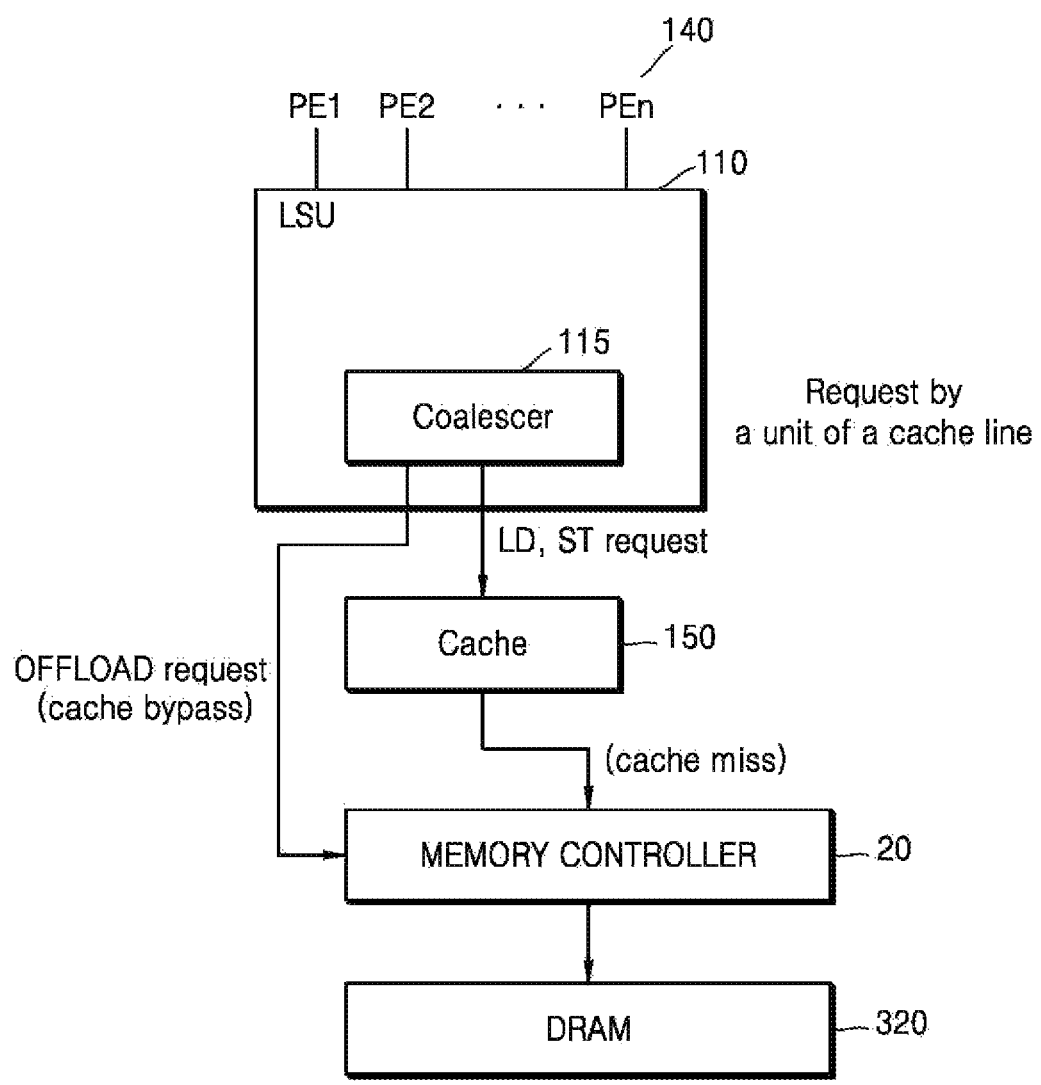
FIG. 8 is a view illustrating processing of an offloading request in the computing system according to an example.

FIG. 8 is a view illustrating processing of an offloading request in the computing system according to an example.

Referring to the example of FIG. 8, memory requests generated by the PEs, PE1, PE2, . . . , PEn 140 are transferred to the loader/storer 110. A coalescer 115 performs coalescence between the memory requests. For example, the memory requests include the load (LD) request, the store (ST) request, or the offloading request transmitted from the PEs PE1, PE2, . . . , PEn 140 that are connected to the loader/storer 110. Here, coalescence refers to combining several memory access requests into a single memory access request.

In this example, when the memory requests are in one warp unit, the coalescer 115 performs coalescence into a memory request of a unit of one cache line. However, when transferring the memory requests to the cache 150, the coalescer 115 possibly transfers only the LD request or ST request to the cache 150, except for the offloading request. The coalescer 115 thus performs a control operation so as to bypass the cache 150 with respect to the offloading request. That is, the coalescer 115 directly transfers the offloading request to the memory controller 20. When a cache miss occurs in the cache 150 with respect to the LD request or ST request, the LD request or ST request is transferred to the memory controller 20. The memory controller 20 then accesses the DRAM 320 so as to transfer a LD request, ST request, or offloading request, in which the cache miss occurs, to the DRAM 320.

That is, the computing system 1 having the internal processor 31 implemented in the memory 30 is operable to bypass the cache 150 of the host processor 10 with respect to the offloading request that corresponds to a certain type of operation.

Figure 9:
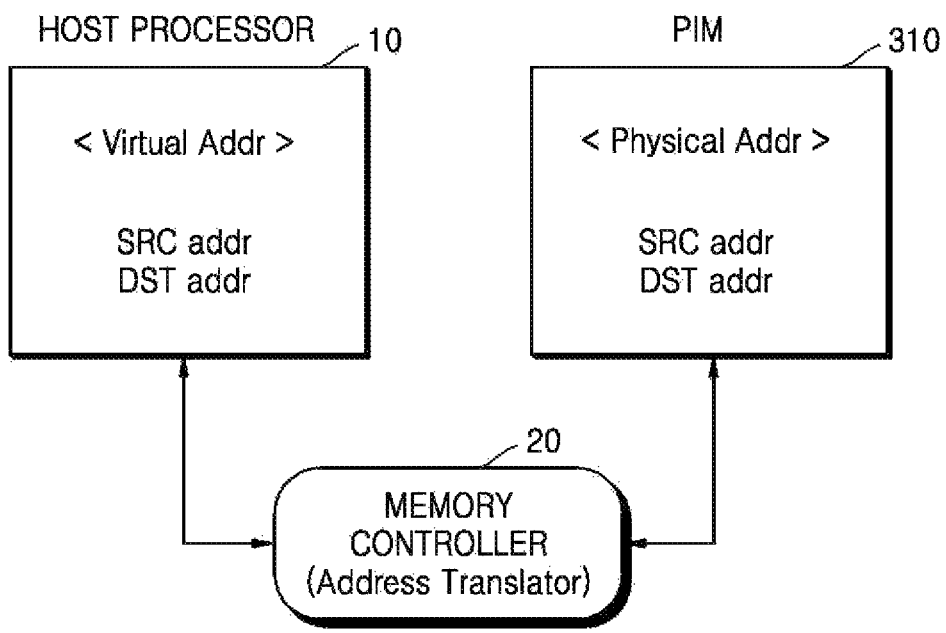
FIG. 9 is a view illustrating address conversion of a memory controller according to an example.

FIG. 9 is a view illustrating address conversion of a memory controller according to an example.

Referring to the example of FIG. 9, the host processor 10 accesses the DRAM 320 in the memory 30 using virtual memory addresses. The PIM 310, for example, the internal processor 31 of FIG. 1, is packaged with the DRAM 320, for example, the memory array 35 of FIG. 1, in the same memory 30, and thus is able to access the DRAM 320 using physical memory addresses.

Accordingly, when the host processor 10 offloads the certain type of operation to the PIM 310, the conversion from virtual memory addresses of which the host processor 10 is aware into physical memory addresses of which the PIM 310 is aware is possibly required. Hence, the memory controller 20 converts the virtual memory addresses used by the host processor 10 into the physical memory addresses used by the PIM 310 and provides the converted addresses to the memory 30.

Figure 10:
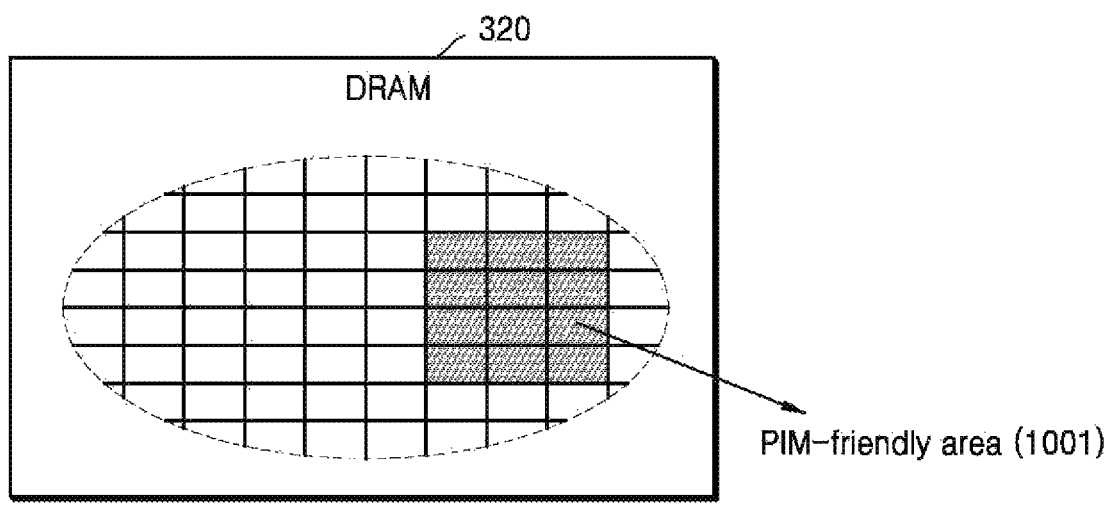
FIG. 10 is a view illustrating a PIM-friendly area set in a dynamic random access memory (DRAM) according to an example.

FIG. 10 is a view illustrating a PIM-friendly area set in a DRAM according to an example.

As described above, the PIM 310 accesses the DRAM 320 in the same package through a dedicated pin, independently of the operation of the host processor 10. For example, the DRAM 320 includes register areas for various hardware devices in the computing system 1 as well as a register area for the host processor 10. According to the examples, the DRAM 320 includes the PIM-friendly area 1001 in which data processed by the PIM 310 is stored and from which data to be processed by the PIM 310 is loaded. That is, in order for the PIM 310 to access the DRAM 320 at a high speed according to the offloading instruction for bypassing the cache 150, a portion of the register area of the DRAM 320 is provided as the PIM-friendly area 1001. When a code for the offloading instruction as shown in the example of FIG.

5 or the example of FIG. 7 is compiled by a compiler, the memory addresses are defined in the PIM-friendly area 1001.

Figure 11:
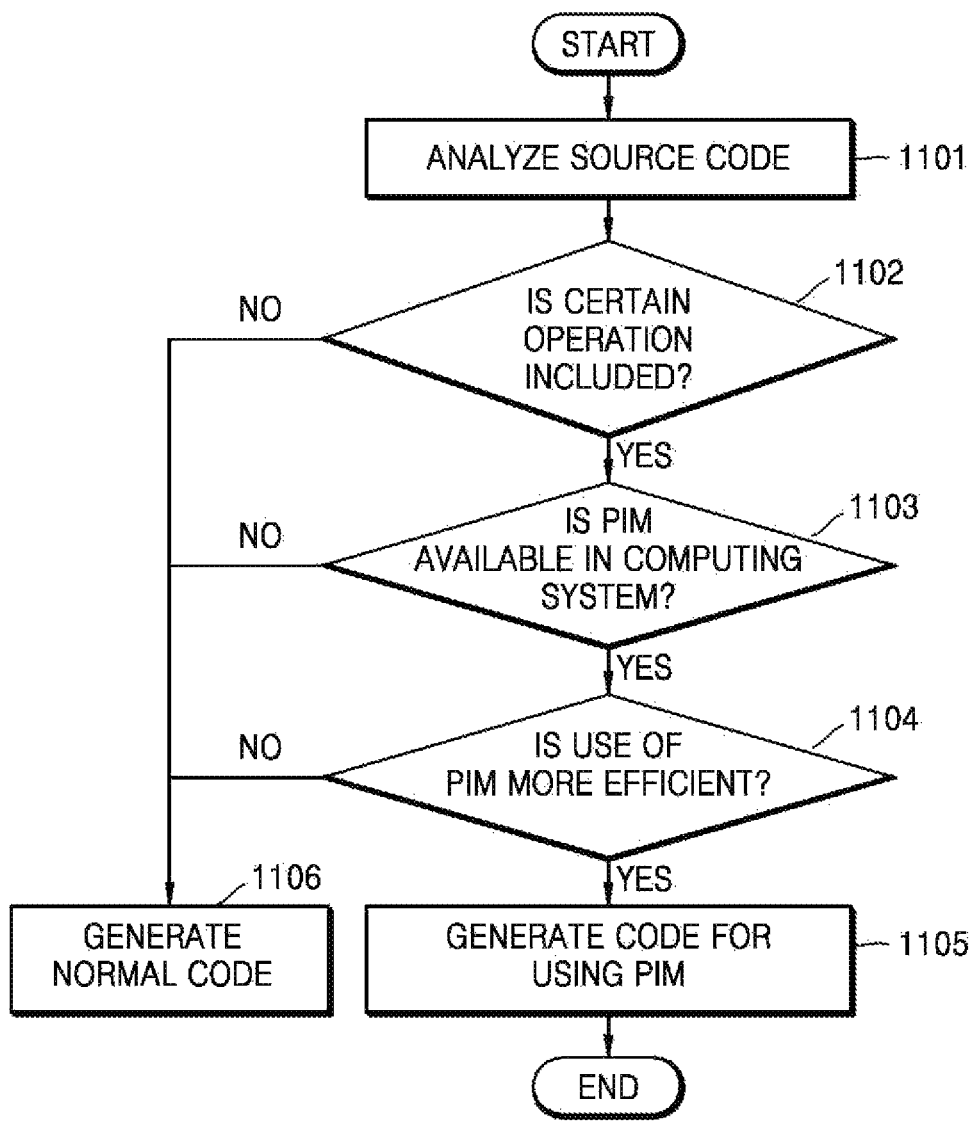
FIG. 11 is a flowchart for illustrating a method of generating a code associated with offloading processing in a compiler according to an example.

FIG. 11 is a flowchart for illustrating a method of generating a code associated with offloading processing in a compiler according to an example.

Referring to FIG. 11, a compiler is possibly included in the computing system 1 or is possibly included in an external device. However, examples are not limited to these particular examples, and other appropriate approaches to providing a compiler for the code are used in other examples.

In operation S1101, the compiler analyzes a given source code. Here, the source code to be analyzed possibly refers to the code shown in the examples, FIG. 4A or 6, but the source code is not limited to these particular examples.

In operation S1102, the compiler determines whether a certain type of operation is included in the source code as a result of the analysis of the source code. Here, the certain type of operation corresponds to an SFU including, but is not limited to, an SQRT operation, a reciprocal operation, a log operation, an exponential operation, a power series operation, a trigonometric operation, and so on. Other aspects of such operations are discussed further, above.

In operation S1103, when the certain type of operation is included in the source code, the compiler determines whether the PIM is available in the computing system in which the source code is to be executed.

In operation S1104, when the PIM 310 is available for use in the computing system 1, the compiler compares a cost required when the certain type of operation is processed using a software library and a cost required when the certain type of operation is processed by offloading to the PIM 310 and determines whether the use of the PIM is a more efficient approach. In this example, the compiler determines whether the use of the PIM 310 is more efficient in consideration of various performance elements and metrics, such as the amount of use of memory bandwidth, the need for memory writing, the expected latency of the PIM operation, the amount of use of a register, and the degree of branching of a code, and so on. These metrics are indicative of factors such as resource usage and timing requirements.

In operation S1105, when the use of the PIM 310 is determined as being more efficient, the compiler generates a code for using the PIM 310. For example, the compiler generates the assembly code 500 described in the example of FIG. 5 or the assembly code 700 described in the example of FIG. 7, but is not limited thereto.

In operation S1106, when the certain type of operation is not included in the source code, the PIM is not available in the computing system 1, or the use of the PIM 310 is inefficient, the compiler generates a normal code, and merely compiles the instruction in a standard, alternative manner. For example, the compiler generate a code for calling an existing software library in order to process a certain operation, such as the assembly code 420 described in FIG. 4B and the assembly code 620 described in FIG. 6B.

When the code is completely generated, the complier transfers the code to the memory array 35 of the computing system 1 such that the code is able to be loaded from the memory array 35 and executed in the computing system 1.

Figure 12:
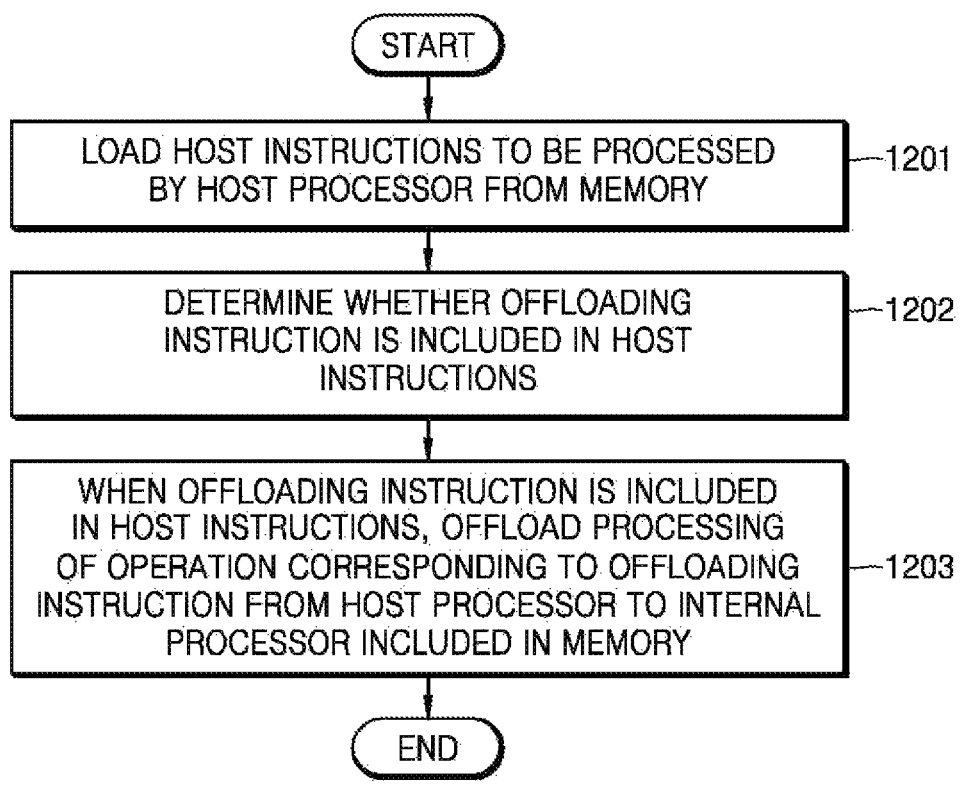
FIG. 12 is a flowchart of a method of processing an operation in the computing system according to an example.

FIG. 12 is a flowchart of a method of processing an operation in the computing system according to an example. Referring to the example of FIG. 12, an operation processing method of the computing system 1 includes steps processed in time series by the computing system 1 as shown in the above drawings. Accordingly, the above-description is also possibly applied to the operation processing method of FIG. 12 although the description is omitted.

In S1201, the host processor 10 loads host instructions to be executed by the host processor 10 from the memory 30.

In S1202, the host processor 10 determines whether an offloading instruction is included in the host instructions.

In S1203, when the offloading instruction is included in the host instructions, the host processor 10 offloads processing of an operation corresponding to the offloading instruction from the host processor 10 to the internal processor 31 of the memory 30.

According to the above-description, it is possible to obtain an accurate operation result, reduce the amount of use of a memory bandwidth of a host processor, and process an operation at a high speed by performing the operation using the PIM.

The apparatuses, units, modules, devices, and other components illustrated in FIGS. 1-12 that perform the operations described herein with respect to FIGS. 1-12 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-12. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described herein with respect to FIGS. 1-12 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computing system comprising:
   a memory controller;
   a host processor configured to process operations; and
   a memory comprising an internal processor and a memory array configured to store host instructions to be processed by the host processor,
   wherein in response to an offloading instruction being included in the host instructions to be processed, the host processor offloads processing of an operation corresponding to the offloading instruction to the internal processor,
   wherein the host processor offloads the processing of the operation corresponding to the offloading instruction to the internal processor based on a result of comparing a cost required when the operation corresponding to the offloading instruction is processed using a software library to a cost required when the operation corresponding to the offloading instruction is processed by the offloading to the internal processor,
   wherein the memory array includes a portion dedicated for data processed by the internal processor and the internal processor accesses the portion of the memory array via a dedicated pin,
   wherein the operation corresponding to the offloading instruction is a special type operation comprising at least one of a square root operation, a reciprocal operation, a log operation, an exponential operation, a power series operation, and a trigonometric operation, and the internal processor comprises hardware logic comprising a special function unit (SFU) configured to process the special type operation,
   wherein the internal processor is a dedicated processor for processing the special type operation,
   wherein the host processor comprises a cache and a processing element (PE) configured to process the host instructions to generate a memory request,
   wherein the generated memory request comprises a load request, a store request, and an offloading request corresponding to the offloading instruction,
   wherein the offloading request bypasses the cache and is transferred to the memory controller, and
   wherein the load request and the store request do not bypass the cache.

2. The computing system of claim 1, wherein:
   the load request or the store request is transferred to the memory controller in response to a cache miss occurring in the cache with respect to the load request or the store request.

3. The computing system of claim 2, wherein the offloading request bypasses the cache and is transferred to the memory controller regardless of the occurrence of a cache hit or the cache miss.

4. The computing system of claim 1, wherein the internal processor stores a result of processing the operation corresponding to the offloading instruction in a buffer of the internal processor or the memory array implemented separately from the internal processor in the memory.

5. The computing system of claim 1, wherein the host processor is a central processing unit (CPU) or a graphics processing unit (GPU), and the internal processor is a processor-in-memory (PIM).

6. A method of processing an operation in a computing system, the method comprising:
   loading host instructions to be processed by a host processor from a memory;
   determining, by the host processor, whether an offloading instruction is included in the host instructions by analyzing source code;

generating a memory request based on the host instructions processed by a processing element (PE) included in the host processor, in response to the offloading instruction being included in the host instructions, comparing a cost required when an operation corresponding to the offloading instruction is processed using a software library with a cost required when the operation corresponding to the offloading instruction is processed by the offloading to an internal processor included in the memory;

offloading processing of the operation corresponding to the offloading instruction from the host processor to the internal processor;

generating a code for using the internal processor when the comparison indicates that the cost required when the operation corresponding to the offloading instruction is processed by the offloading to the internal processor is less than the cost required when the operation corresponding to the offloading instruction is processed using a software library; and driving hardware logic of a special function unit (SFU) implemented in the internal processor in order to process the operation corresponding to the offloading instruction, wherein the offloading comprises offloading the processing of the operation corresponding to the offloading instruction based on a result of the comparison, wherein the operation corresponding to the offloading instruction is a special type operation comprising at least one of a square root operation, a reciprocal operation, a log operation, an exponential operation, a power series operation, and a trigonometric operation, wherein the internal processor is a dedicated processor for processing the special type operation, wherein the generated memory request comprises a load request, a store request, and an offloading request corresponding to the offloading instruction, wherein the offloading request bypasses a cache of the host processor and is transferred to a memory controller, and wherein the load request and the store request do not bypass the cache.

7. The method of claim 6, wherein,
the load request or the store request is transferred to the memory controller of the computing system when a cache miss occurs in the cache of the host processor with respect to the load request or the store request.

8. The method of claim 6, further comprising storing a result of processing the operation corresponding to the offloading instruction, which is performed by the internal processor, in a buffer of the internal processor or a memory array implemented separately from the internal processor in the memory.

9. The method of claim 6, wherein the host processor is a central processing unit (CPU) or graphics processing unit (GPU), and the internal processor is a processor-in-memory (PIM).

10. A host processor comprising:
a loader/storer configured to load host instructions stored in a memory;
a cache;
a processing element (PE) configured to process the host instructions to generate a memory request;
a determiner configured to determine whether an offloading instruction is included in the host instructions; and
a controller configured to offload processing of an operation corresponding to the offloading instruction from the host processor to an internal processor included in the memory in response to an offloading instruction being included in the host instructions, wherein the controller offloads the processing of the operation corresponding to the offloading instruction to the internal processor based on a result of comparing a cost required when the operation corresponding to the offloading instruction is processed using a software library to a cost required when the operation corresponding to the offloading instruction is processed by the offloading to the internal processor, and wherein a code is generated for using the internal processor when the comparison indicates that the cost required when the operation corresponding to the offloading instruction is processed by the offloading to the internal processor is less than the cost required when the operation corresponding to the offloading instruction is processed using a software library, wherein the operation corresponding to the offloading instruction is a special type operation comprising at least one of a square root operation, a reciprocal operation, a log operation, an exponential operation, a power series operation, and a trigonometric operation, and the internal processor comprises hardware logic comprising a special function unit (SFU) configured to process the special type operation, wherein the internal processor is a dedicated processor for processing the special type operation, wherein the offloading instruction includes a first memory address and a second memory address, wherein the first memory address corresponds to a loading location of data upon which the special type operation is performed, wherein the second memory address corresponds to a storage location for a result of the special type operation, wherein the offloading instruction is coalesced into a single memory request, wherein the generated memory request comprises a load request, a store request, and an offloading request corresponding to the offloading instruction, wherein the offloading request bypasses the cache and is transferred to a memory controller, and wherein the load request and the store request do not bypass the cache.

* * * * *